Nov. 16, 1948.   G. E. STOLTZ   2,454,232
CONTROL SYSTEM
Filed Nov. 2, 1946
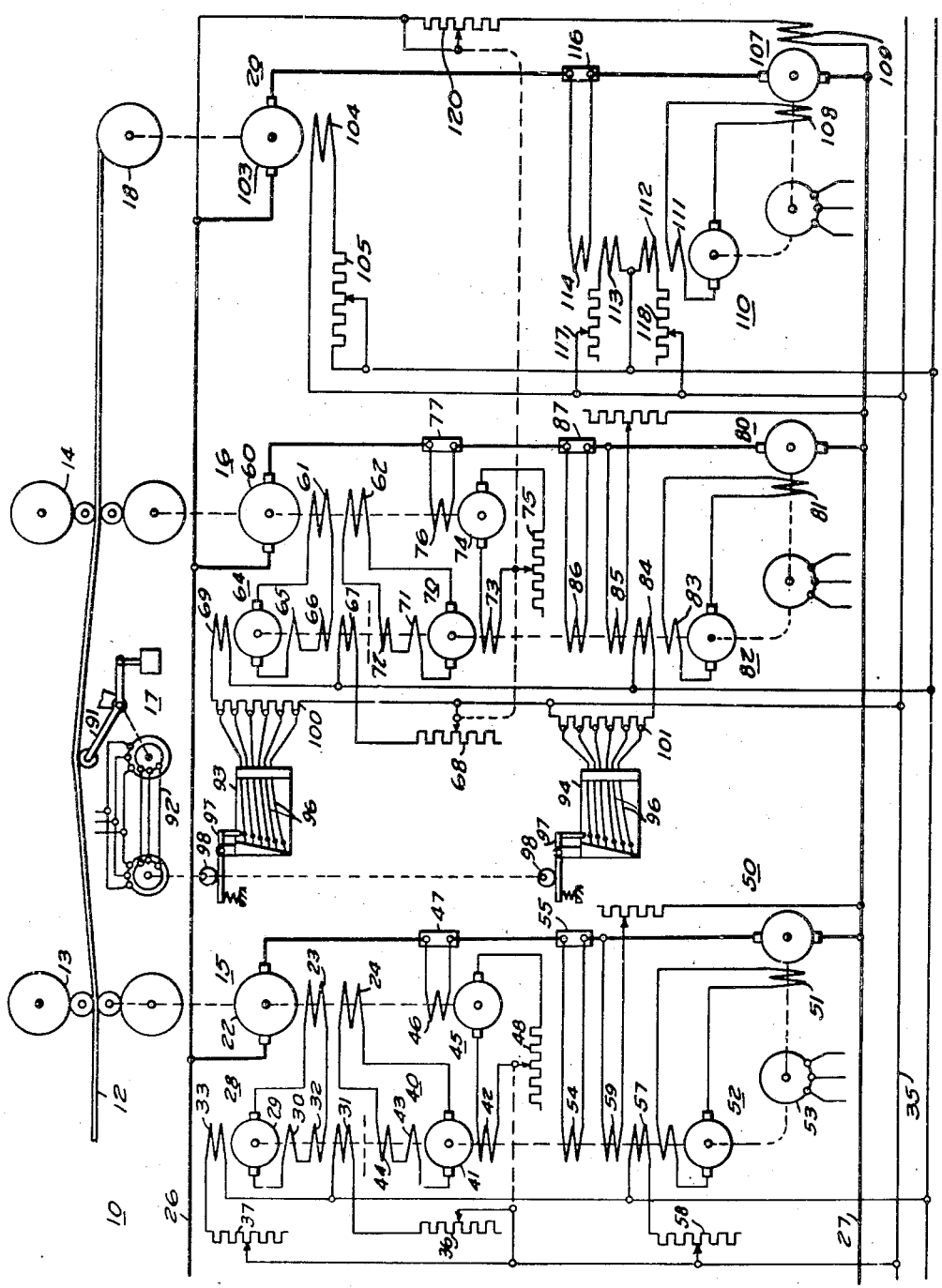
WITNESSES:
E.A. McCloskey
F.V. Giolma
INVENTOR
Glenn E. Stoltz.
BY
G.W. Crawford
ATTORNEY Patented Nov. 16, 1948

2,454,232

UNITED STATES PATENT OFFICE 2,454,232

CONTROL SYSTEM

Glenn E. Stoltz, Pittsburgh, Pa., assignor to Westinghouse Electric Corporation, East Pittsburgh, Pa., a corporation of Pennsylvania Application November 2, 1946, Serial No. 707,477

9 Claims. (Cl. 318—6)

My invention relates, generally, to electrical control systems and it has reference, in particular, to control systems for tandem strip rolling mills and the like.

Generally stated, it is an object of my invention to provide an improved control system for rolling mills and the like which is simple and inexpensive to manufacture, and which is reliable and efficient in operation.

More specifically, it is an object of my invention to provide for controlling the operation of the roll stand and reel motors of a tandem strip rolling mill by means of regulating generators.

It is also an object of my invention to provide for using a regulating generator, which is responsive to the speed and current of a motor, for controlling the energization of a magnetizing field winding on the motor.

Another object of my invention is to provide for regulating the operation of a motor in accordance with predetermined characteristics of the motor load, and for additionally varying the energization of a magnetizing field winding thereof in response to operation of speed control means of the motor.

Yet another object of my invention is to provide for jointly varying the armature voltage and field current of a motor to regulate the motor torque.

An important object of my invention is to provide for using a regulating generator to maintain the energization of a magnetizing field winding on the motor proportional to both the speed and load of the motor.

Yet another important object of my invention is to provide for controlling the operation of a roll driving motor in a rolling mill by means of regulating generators which determine the energizations of shunt and magnetizing field windings thereof and for varying the energizations of these field windings in opposite senses.

A further object of my invention is to provide for using a series or booster generator to control the operation of a reel motor, and for varying the voltage of said generator in accordance with the energization of the pattern field winding of a regulating generator asosciated with the preceding roll driving motor.

Other objects will, in part, be obvious and will, in part, be explained hereinafter.

In practicing my invention in one of its forms, tensiometers are used between any number of successive stands of a tandem strip rolling mill to control the operation of the succeeding roll motor, although, in some instances, it may be desirable to control the preceding motor. The main field winding of the roll driving motor is energized by a main regulating generator which is responsive to the operating position of the preceding tensiometer and to a predetermined pattern field energization. A booster generator in series with the roll motor is controlled by a booster regulating generator which is responsive to the roll motor load. A magnetizing regulating generator responsive to the speed and load of the roll motor maintains the magnetizing field winding excitation in the proper relation to the motor speed by having its pattern field energization varied in the opposite sense to variations in the energization of the main field regulating generator. Tension between stands is maintained by using the tensiometer to vary the effective pattern field excitation of either or both the main and booster regulating generators. A reel motor tension regulator maintains the proper reel motor torque by maintaining a predetermined armature current through the medium of a bucking generator which varies the reel motor armature voltage. The voltage of the bucking generator is varied in accordance with variations in the pattern field energization of the regulating generators of the preceding stand.

For a more complete understanding of the nature and scope of my invention, reference may be made to the following detailed description which may be studied in connection with the accompanying drawing, in which the single figure is a diagrammatic view of a control system for a tandem strip rolling mill which embodies the invention in one of its forms.

Referring to the drawing, the reference numeral 10 may denote, generally, a control system for a tandem strip rolling mill in which a strip of material 12 may be worked upon by roll stands 13 and 14 driven by roll motors 15 and 16, respectively. For the purposes of simplification only one stand 14 controlled by tension responsive means 17 is shown. Any number of such stands may, of course, be used. The strip may be wound on a reel 18 driven by a reel motor 20.

The roll motor 15 may be provided with an armature 22, a main or shunt field winding 23, and a magnetizing field winding 24. The armature 22 may be connected to a suitable source of electrical energy represented by the conductors 26 and 27, which may be connected to a source of variable voltage. The main shunt field winding 23 may be energized from a main regulating generator 28 having an armature 29, a self-energizing or series field winding 30, a pattern field winding 31, a differential field winding 32, and an auxiliary pattern or bias field winding 33.

The pattern and bias field windings 31 and 33 may be connected to a suitable source of electrical energy, such as the control bus 35 through rheostats 36 and 37, respectively, for basically determining the energization of the main field winding 23 of the roll motor 15. The differential field winding 32 may be connected in series circuit relation with the main field winding 23 for opposing the pattern and bias field windings so as to obtain a balance when the field current of the main field winding 23 is of the correct value. The self-energizing field winding 30 is also connected in series circuit relation with the main field winding 23 and is arranged to maintain the output voltage of the regulator generator 28 at the necessary value to maintain a proper value of field current under balanced conditions.

In order to regulate the speed of the roll motor 15 and compensate for the demagnetizing effects of the armature current under different load conditions, energization of its magnetizing field winding 24 may be effected by means of a magnetizing regulating generator 40. The generator 40 may be provided with an armature 41, a pattern field winding 42, a self-energizing field winding 43, and a differential field winding 44. The self-energizing and differential field windings 43 and 44 may be connected in series circuit relation with the magnetizing field winding 24 of the motor 15, while the pattern field winding 42 may be energized from a pilot generator 45. The pilot generator may be driven by the roll motor 15 and its field winding 46 may be energized in accordance with the load of the roll motor by being connected across a shunt 47 in the armature circuit thereof, so that its output is responsive to both the speed and load of the motor 15.

Control means, such as the rheostat 48, may be provided for varying the energization of the pattern field windings 42. Since the demagnetizing effect of the armature current varies inversely with the speed of the motor, the rheostat 48 may be operatively connected to the rheostat 36 which determines the energization of the main field winding 23, so as to effect joint operation of the rheostats in opposite senses, unless it is desired to use the magnetizing field winding 24 for producing a series or drooping load characteristic in which case the rheostats may operate in the same senses.

In order to provide for maintaining or regulating the speed of the roll motor 15 under varying load conditions, a booster generator 50 may be utilized to vary the voltage applied to the armature 22 of the roll motor 15 primarily to compensate for the IR drop in the roll motor armature circuit. The booster generator 50 may be provided with a field winding 51 which may be energized from a booster regulating generator 52. The regulating generator 52 and booster generator 50 may be driven by a common motor 53. The output of the booster regulating generator 52 may be controlled by providing it with a pattern field winding 54, which may be energized in accordance with the roll motor armature current. The winding 54 may, for example, be connected across a shunt 55 in circuit with the armatures of the booster generator 50 and the roll motor 15. An auxiliary pattern or bias field winding 57 on the regulating generator 52 may be energized from the conductors 35 through a rheostat 58. A differential field winding 59 may be connected across the armature of the booster generator 50 for producing a field balancing the pattern and bias fields to regulate the output voltage thereof.

The roll motor 16 may be provided with an armature 60, a main or shunt field winding 61, and a magnetizing field winding 62. The armature 60 may be connected to the variable voltage source represented by conductors 26 and 27. The main field winding 61 may be energized from a main regulating generator 64 similar to the regulating generator 28 of the roll motor 15. The regulating generator 64 may be provided with a self-energizing field winding 65 and a differential field winding 66 connected in series circuit relation with the main field winding 61. This regulating generator also may be provided with a pattern field winding 67 connected to the conductors 35 through a suitable rheostat 68, and a control or bias field winding 69 the purpose of which will be explained hereinafter.

Energization of the magnetizing field winding 62 of the roll motor 16 may be effected by connecting it to a magnetizing regulating generator 70, which may be provided with self-energizing and differential field windings 71 and 72 connected in series circuit relation with the magnetizing field winding 62 and a pattern field winding 73 which may be energized from a pilot generator 74 through a suitable rheostat 75. The field winding 76 of the pilot generator may be energized in accordance with the armature current of the roll motor 16 by connecting it across the shunt 77 in the armature circuit thereof.

Normal regulation of the roll motor 16 may be effected by varying the voltage applied to its armature by means of a booster generator 80 having a field winding 81. Energization of the field winding 81 may be effected from a booster regulating generator 82 having a self-energizing field winding 83 connected in circuit relation with the field winding 81, a control or bias field winding 84, a differential field winding 85 connected across the armature of the booster generator, and a pattern field winding 86 which may be connected across a shunt 87 in the armature circuit of the motor 16.

In order to provide for controlling the tension in the strip 12, tension responsive means, such as the tensiometer 17, may be provided embodying a bell crank 91 which may be actuated in accordance with the tension in the strip 12 against the action of an operating spring or other source of elastic force. The operating position of the bell crank 91 will, therefore, depend on the tension in the strip 12.

Movement of the bell crank 91 may be transmitted by means of a synchro-tie system 92 to actuate suitable regulating devices, such as the rheostatic regulators 93 and 94. The rheostatic devices 93 and 94 may comprise, for example, a plurality of flexible contact fingers 96 which may be progressively actuated into the contact with each other by means of arms 97 operated by cams 98 actuated by the synchro-tie system 92. The flexible contact fingers 96 may be connected to resistors 100 and 101 at spaced intervals for varying the effective values thereof. By connecting the resistors 100 and 101 in circuit relation with the control windings 69 and 84 of the main and magnetizing regulating generators 64 and 82, respectively, the respective outputs of these generators may be varied to reduce or increase the speed of the roll motor 16 and reduce or increase the tension of the strip 12 between the stands 13 and 14. The tensiometer 17 may be used either to regulate the tension during normal running when working at high speeds with light strip, or it may be adjusted to be effective only when the tension increases to about 50% above normal, in the case of heavy strip at low speeds.

The reel motor 20 may be provided with an armature 103 and a field winding 104. The field winding 104 may be connected to a suitable source of electrical energy, such as the conductors 35, through a control resistor 105. The armature 103 may be connected to the variable voltage bus conductors 26 and 27 so that the speed of the reel motor will vary substantially in proportion to variations in the speed of the roll motors as determined by variation of the voltage between the conductors 26 and 27. The tension in the strip 12 between the roll stand 14 and the reel 18 may be determined by regulating the voltage applied to the armature 103 of the reel motor through the use of a bucking or boosting generator 107 having an auxiliary field winding 108 and a main field winding 109.

The auxiliary field winding 108 may be energized from a tension regulating generator 110 having a self-energizing field winding 111 connected in series circuit relation with the field winding 108, a pattern field winding 112, a bias field winding 113, and a differential field winding 114. The differential field winding may be energized in accordance with the reel motor armature current by connecting it across a shunt 116. A rheostat 118 may be provided for adjusting the energization of the pattern field winding 112 to determine the value of the tension in the strip 12. Suitable means represented by the rheostat 117 may be provided, if desired, for varying the effective value of the bias field winding energization during accelerating and decelerating to compensate for the inertia of the strip reel and other rotating parts.

In the operation of the system, the voltages produced by the booster generators 50 and 80 will be proportional to the loads on the roll motors 15 and 16, respectively, so they compensate for the ohmic drops in the armature circuits of these motors. The voltages produced by the magnetizing regulating generators 40 and 70 are respectively proportional to the loads and speeds of these motors also. As a result these roll motors 15 and 16 respond, regardless of the particular load or the value of torque required to accelerate or retard the mill, as though they are operating under no load conditions. Accordingly, accurate synchronization of these motors is readily obtained under all conditions.

When the roll motors 15 and 16 are operating at base speed, the main field winding circuit is essentially saturated and the principal regulation will be obtained through armature control by the booster generators 50 and 80. Any variation in strip tension above a predetermined value is immediately reflected in the position of the bellcrank 91 of the tensiometer device 17 which alters the effective values of the resistors 100 and 101. The energization of the control field windings 69 and 84 of both the main and booster regulating generators 64 and 82, respectively, are altered correspondingly. The energization of the main field winding 61 of the roll motor 16 will thus be increased should the tension of the strip 12 increase while the energization of the field winding 81 will decrease. Both results tend to slow down the roll motor 16 and reduce the tension to the predetermined desired value. When the roll motor 16 is operating at base speed, the change in the voltage of the booster generator 80 will predominate, while both the change in the energization of the main field winding 61 and the change in the energization of the magnetizing field winding 62 will be effective when the motor is operating above the base speed, where the effects are more critical.

Should the rheostat 68 be adjusted to increase the speed of the roll motor 16 by reducing the energization of the pattern field winding 67, the rheostat 75 will be concurrently adjusted to increase the energization of the pattern field winding 73 so as to provide greater compensation for the increased demagnetizing effect of the armature current at higher speeds. At the same time, the field rheostat 120 of the auxiliary field winding 108 of the reel booster generator 107 will also be actuated to increase the voltage applied to the armature 103 of the reel motor 20 so as to maintain the predetermined tension in the strip 12.

From the above description and the accompanying drawing, it will be apparent that I have provided a tandem strip mill control system which is simple and effective in design and which is reliable and efficient in operation. Regulation of the tension of the strip is readily effected under all operating conditions so that strip may be rolled at relatively high tension without fear of breakage. By compensating for the magnetizing effect and for the ohmic drops in the system close regulation and accurate gauging of the material may be obtained over a wide range of speeds.

This feature is particularly valuable due to the fact that the tension between the roll stands on the delivery end of the strip mill increases as the mill speed is decreased from normal running speed to a threading speed of possibly $\frac{1}{10}$ normal running or operating speed. With the control as described, tension is maintained and accurate gauge obtained under normal running conditions. When the mill is slowed down, this control will attempt to maintain gauge up to a predetermined value of tension which can be sustained without too much risk of breaking the strip. At this value, either the voltage on the roll motor armature or on its main field winding, or both, are biased to reduce the speed of the roll motor sufficient to prevent the tension from increasing beyond its predetermined limit.

The voltage on the booster generator may not only be reduced to zero value, but increased in the opposite direction to still further reduce the voltage on the roll motor.

Another feature which may be incorporated in the magnetizing generator control is to increase its effect to provide sufficient series field to cause a slight droop in speed of the roll motor with increase in armature load current. This can be done to assure stable operation of the motor under all load and speed conditions. When this is done, it may be found that greater magnetizing field current is required at base speed than at weakened field operation.

Since certain changes may be made in the above-described construction and different embodiments of the invention may be made without departing from the spirit and scope thereof, it is intended that all the matter contained in the above description and shown in the accompany-

I claim as my invention:

1. A control system for a motor having an armature and a field winding comprising, circuit means connecting the armature to a source of electrical energy, control means responsive to the speed of the motor and a load on the motor, and a regulating generator connected to energize the field winding of the motor, said regulating generator being differentially responsive to said means and to the field current of the motor.

2. In a control system for a motor having an armature and field winding, circuit means connecting the armature to a source of electrical energy, control means connected in circuit with the motor armature and the source operable to vary the voltage applied to the armature, control means jointly responsive to the speed of the motor and to a load on the motor, and regulating means responsive to said means operable to vary the output of the control means and energization of said field winding.

3. In a control system for a roll driving motor of a strip rolling mill having an armature and a field winding, means producing a voltage responsive to the tension of the strip, a regulating geneartor differentially responsive to said voltage and to the current of one of the field windings connected to maintain the energization of said field winding, circuit means connecting the armature of the roll motor to a source of electrical energy, control means connected in circuit relation with said armature to vary the voltage applied thereto from the source, and regulating means responsive to the first mentioned means operable to control operation of said means.

4. In a control system for a motor having an armature and a field winding, control means producing a voltage proportional to the speed and load of the motor, and a regulating generator connected to energize said field winding differentially with respect to said voltage and the field winding current.

5. In a control system for a strip mill motor having an armature and a plurality of field windings, circuit means connecting the armature to a source of electrical energy, control means operable to produce a control voltage proportional to the speed and the load of the motor, a regulating generator connected to energize one of the field windings differentially with respect to said control voltage and the current in the field winding, an additional regulating generator connected to energize another of the field windings in accordance with the tension of the strip, and means operable to vary the energizations of the field windings jointly.

6. For use with a strip mill motor having an armature and a plurality of field windings, means producing a voltage proportional to the speed and the load of the mill motor, a regulating generator connected to energize one of said field windings in accordance with a predetermined load characteristic of the motor, a pilot generator operable to produce a voltage having predetermined relations to the speed and load of the motor, a regulating generator connected to energize another one of said field windings in accordance with the voltage of said pilot generator, and means jointly varying the energizations of said field windings in opposite senses.

7. In a control system for a strip mill motor having an armature connected to a source of electrical energy and a plurality of field windings, means producing a variable voltage responsive to the tension of a strip of material in the mill, a regulating generator of the self-energizing type connected to energize one of the field windings in predetermined relation to the variable voltage of the tension device, a pilot generator driven by the motor and having a field winding energized in accordance with the armature current of the motor for producing a variable control voltage, an additional regulating generator of the self-energizing type connected to energize another of the field windings in predetermined relation to said variable control voltage, and means operable to vary the predetermined relations of the energizations of said field windings in opposite senses jointly.

8. For use with a roll stand adapted to work on strip material, a motor connected to drive said roll stand, means responsive to the tension of the strip operable to maintain the speed of the motor in predetermined relation to the strip tension, control means responsive to the speed and load of the motor to produce a predetermined counterdemagnetizing effect in the motor, a reel motor operable in predetermined relation with the roll motor to wind the strip, and means jointly operable to vary said predetermined relations.

9. In a control system for a roll driving motor having an armature arranged to be energized from a source of electrical energy and a plurality of field windings; a pilot generator driven by the roll motor for producing a variable control voltage and having a field winding energized in accordance with the armature current of the roll motor; a regulating generator connected to energize one of the motor field windings and having a pattern field winding energized in accordance with said variable control voltage and a differential field winding energized in accordance with the armature current of the roll motor; an additional regulating generator connected to energize another of the motor field windings, said generator having a pattern field winding energized from a source of substantially constant control voltage, a cumulative control field winding energized in accordance with the tension of the strip and a differential field winding energized in accordance with the current of said another field winding; and means operable to vary the energizations of the pattern field windings jointly in opposite senses.

GLENN E. STOLTZ.

No references cited.